US008756302B2

(12) United States Patent
Cowan et al.

(10) Patent No.: US 8,756,302 B2
(45) Date of Patent: Jun. 17, 2014

(54) METHOD AND SYSTEM FOR DETERMINING COMPUTER RESOURCE USAGE IN UTILITY COMPUTING

(75) Inventors: John D. Cowan, Grand Cayman (GB); Delano Seymour, St. Davids (GB); Julian Carlington, St. Davids (GB)

(73) Assignee: 6Fusion USA Inc., Wilmington, DE (US)

( * ) Notice: Subject to any disclaimer, the term of this patent is extended or adjusted under 35 U.S.C. 154(b) by 251 days.

(21) Appl. No.: 13/125,661

(22) PCT Filed: Oct. 22, 2009

(86) PCT No.: PCT/CA2009/001550
§ 371 (c)(1),
(2), (4) Date: Apr. 22, 2011

(87) PCT Pub. No.: WO2010/045744
PCT Pub. Date: Apr. 29, 2010

(65) Prior Publication Data
US 2011/0219118 A1  Sep. 8, 2011

Related U.S. Application Data

(60) Provisional application No. 61/107,557, filed on Oct. 22, 2008.

(51) Int. Cl.
*G06F 15/173* (2006.01)
(52) U.S. Cl.
USPC ........................................................ 709/223
(58) Field of Classification Search
USPC ................. 709/220, 223, 224, 226; 370/229, 370/235–240; 705/30, 400; 718/1, 100, 718/104, 105
See application file for complete search history.

(56) References Cited

U.S. PATENT DOCUMENTS

| | | | | |
|---|---|---|---|---|
| 7,499,968 | B1* | 3/2009 | Alexander et al. | 709/203 |
| 7,672,882 | B2* | 3/2010 | Agarwal et al. | 705/34 |
| 7,756,989 | B2* | 7/2010 | Goldszmidt et al. | 709/229 |
| 8,046,763 | B1* | 10/2011 | Czajkowski et al. | 718/104 |
| 8,145,455 | B2* | 3/2012 | Cherkasova et al. | 703/2 |
| 8,260,603 | B2* | 9/2012 | Cherkasova et al. | 703/23 |
| 2006/0218059 | A1 | 9/2006 | Hartley et al. | |
| 2006/0225079 | A1* | 10/2006 | Nayak et al. | 718/105 |
| 2007/0112652 | A1 | 5/2007 | Ricketts et al. | |
| 2008/0097801 | A1* | 4/2008 | MacLellan et al. | 705/7 |
| 2008/0097932 | A1 | 4/2008 | Dyck et al. | |
| 2008/0178190 | A1* | 7/2008 | Anstey et al. | 718/104 |
| 2009/0235267 | A1* | 9/2009 | McKinney et al. | 718/104 |
| 2009/0328050 | A1* | 12/2009 | Liu et al. | 718/104 |

\* cited by examiner

*Primary Examiner* — Anh-Vu Ly
*Assistant Examiner* — Phyllis Book
(74) *Attorney, Agent, or Firm* — Barnes & Thornburg LLP; Thomas J. McWilliams; Edward F. Behm, Jr.

(57) ABSTRACT

A universal platform for utility computing that allows service providers to charge clients for the services rendered according to a dimensionless cross-platform universal metric. The platform measures or monitors six metrics commonly used in software computing (MHz for CPU usage, Mbytes for memory usage, Kbytes/sec for I/O, Kbytes/sec for LAN, Kbits/sec for WAN and Gbytes for storage) and applies appropriate weighting and conversion factors to each consumption value to a value in the universal metric that can be applied agnostically to any system or application. The metric can also take other controllable variables into account, such as real estate cost, tax jurisdiction and electrical power. The metric effectively a metric makes diverse computing resources comparable. The total value of the resources consumed by a user determines the cost charged for the use of the computing services.

17 Claims, 6 Drawing Sheets

METHOD AND SYSTEM FOR DETERMINING COMPUTER RESOURCE USAGE IN UTILITY COMPUTING

CROSS-REFERENCE TO RELATED APPLICATIONS

This application claims the benefit of U.S. Provisional Application No. 61/107,557, filed Oct. 22, 2008, the contents of which are incorporated herein by reference in their entirety.

FIELD OF THE INVENTION

The present invention relates generally to computing systems. More particularly, the present invention relates to utility computing.

BACKGROUND OF THE INVENTION

Utility computing is the packaging of computing resources, such as processing and storage, as a metered service similar to a traditional public utility (such as electricity, water, natural gas, or telephone network). Such computing services have the advantage of a low or no initial cost to acquire hardware; instead, computational resources are essentially rented. Customers with very large computations or a sudden peak in demand can also avoid the delays that would result from physically acquiring and assembling a large number of computers. Utility computing usually uses some form of virtualization so that the large amount of storage or computing power available is seen by users as virtual machines.

A challenge with conventional utility computing models, for both the service provider and end user, is appropriately determining usage of the resources, and appropriately costing the resources. Depending on the specific application, utility computing providers typically price the services based on a metered processor usage (i.e. MIPS/sec), or on the amount of storage used (i.e. GB). Such metrics give only a rough approximation of usage, and may not accurately reflect the true resource usage.

The current metrics in utility computing are also an impediment to adoption by end users. A single metric, such as CPU usage, does not provide end users with sufficient granularity in understanding the resource usage of different applications. However, monitoring the usage of many different computing resources leads to confusion, and an inability to relate the different metrics to the ultimate utility pricing model.

It is, therefore, desirable to provide an improved method of determining computer resource usage in utility computing.

SUMMARY

In a first aspect, there is provided a method of determining computing resource usage in a utility computing environment having a plurality of network infrastructure nodes. Each network infrastructure node includes a plurality of computing resource types, such as processors (CPUs), memory, storage, input/output (I/O), and local and wide area network resources. Each of these resources is measured or metered according to its respective resource unit, such as MHz for CPU, MBytes (MB) for memory, and GBytes (GB) for storage. The method comprises first, for each of the plurality of network infrastructure nodes: determining, for each resource type, an adjusted cost per predetermined time unit to deploy and operate each of the plurality of computing resource types; and applying a cost conversion factor to each adjusted cost to determine a number of resource units comprising a quantum of a universal metric. Then, for each computing resource type, an average number of resource units per quantum of the universal metric is generated by averaging the number of resource units over the plurality of network infrastructure nodes.

Once the average composition of the resources within the utility computing environment, normalized to the universal metric, has been generated, an application or workload can be deployed for execution on one or more nodes within the utility computing environment. For each such application, the usage of each computing resource type is periodically monitored to generate a number of resource units used in a predetermined time period. The number of resource units used in the predetermined time period is then converted according to the average number of resource units per quantum of the universal metric for the respective computing resource type to determine a quanta of the universal metric consumed in the predetermined time period. A total resource consumption is then generated by adding the quanta of the universal metric consumed by the application in the predetermined time period for each computing resource type. In a further embodiments, an adjusted total resource consumption can be generated by modifying the total resource consumption according to an environmental factor, such as location of the network infrastructure node or an overhead cost factor.

When a new network infrastructure node is added, or deployed, to the utility computing environment, the method can further comprise determining, for each resource type, an adjusted cost per predetermined time unit to deploy and operate each of the plurality of computing resource types in the new network infrastructure node. The cost conversion factor is then applied to each adjusted cost to determine a number of resource units comprising a quantum of a universal metric. For each computing resource type in the new network infrastructure node, an updated average number of resource units per quantum of the universal metric is then generated by averaging the number of resource units over the plurality of network infrastructure nodes and the new network infrastructure node; and the average number of resource units per quantum of the universal metric is set to the updated average number of resource units per quantum of the universal metric when the updated average number of resource units per quantum of the universal metric exceeds the average number of resource units per quantum of the universal metric by a predetermined threshold, such as 50%.

The method can further comprise profiling resource consumption of the application, in one or more modes. First, the usage of each computing resource type by the application during a predetermined profiling period is analyzed to determine a mean usage of each computing resource type. Then, for each computing resource type, a mean resource consumption is generated by converting the mean usage according to the average number of resource units per quantum of the universal metric for the respective computing resource type. The mean resource consumption for each computing resource type can be periodically updated. A total mean resource consumption for the application can then be generated by adding the mean resource consumptions for each computing resource type.

In a further embodiment of the method, data related to at least one of the periodically monitored usage of each computing resource type, the quanta of the universal metric consumed in the predetermined time period for each computing resource type and the total resource consumption are stored, and a report is generated based on the stored data.

In a further aspect, a computer program product operating within a utility computing system having a plurality of network infrastructure nodes is provided. Again, each network infrastructure node includes a plurality of computing resource types measured according to respective resource units. The computer program product comprises, or embodies, code, which, when executed on a processor, causes a processor to provide, or implement, a node analysis engine, a metering engine, and a consumption engine. The node analysis engine determines, for each resource type, an adjusted cost per predetermined time unit to deploy and operate each of the plurality of computing resource types; applies a cost conversion factor to each adjusted cost to determine a number of resource units comprising a quantum of a universal metric; and, for each computing resource type, generates an average number of resource units per quantum of the universal metric by averaging the number of resource units over the plurality of network infrastructure nodes. The metering engine receives, for an application executing on at least one of the network infrastructure nodes, periodically monitored usage of each computing resource type to generate a number of resource units used in a predetermined time period; and for each computing resource type, determines a quanta of the universal metric consumed in the predetermined time period by converting the number of resource units used in the predetermined time period according to the average number of resource units per quantum of the universal metric for the respective computing resource type. The consumption engine generates a total resource consumption by adding the quanta of the universal metric consumed by the application in the predetermined time period for each computing resource type. The computer program product can further cause the processor to provide a profiling engine that profiles resource consumption of the application by analyzing the usage of each computing resource type by the application during a predetermined profiling period to determine a mean usage of each computing resource type; and, for each computing resource type, generating a mean resource consumption by converting the mean usage according to the average number of resource units per quantum of the universal metric for the respective computing resource type.

BRIEF DESCRIPTION OF THE DRAWINGS

Embodiments of the present invention will now be described, by way of example only, with reference to the attached Figures, wherein.

DETAILED DESCRIPTION

Figure 1:
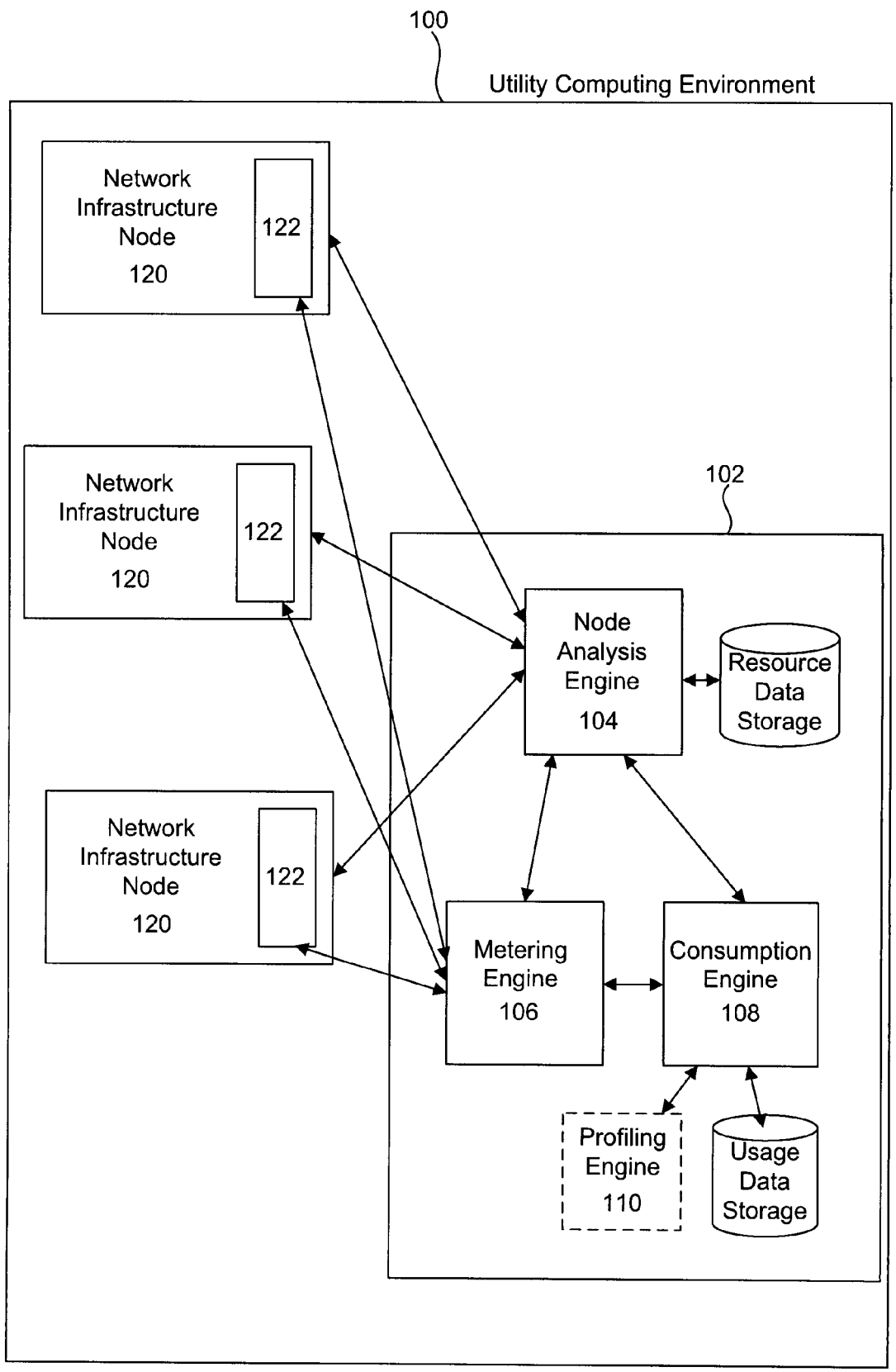
FIG. 1 is a block diagram of the system and its environment.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer program product, a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Generally, the present invention provides a universal platform for utility computing that allows service providers to effectively monitor the usage of computing resources, and provides a universal or common metric that permits easy comparison of resource usage and provides a single unit to charge clients for the services rendered. In an embodiment, the platform measures or monitors six metrics commonly used in software computing (e.g. MHz for CPU or processor usage, Mbytes for memory usage, Kbytes/sec for I/O, Kbytes/sec for Local Area Network (LAN) usage, Kbits/sec for Wide Area Network (WAN) usage and Gbytes for storage usage) and applies appropriate weighting and conversion factors to each consumption value to derive a dimensionless quantity (termed herein a Workload Allocation Cube (WAC) unit or value) that can be used as a universal, or common, metric. As used herein, a Workload Allocation Cube (WAC) is itself a universal metric that provides the number of resource units equivalent to a single WAC unit for each of the six monitored resource types. A WAC can be applied agnostically to any system and application. The metrics can also take other environmental or controllable variables into account, such as real estate cost, tax jurisdiction and electrical power. The WAC unit is effectively a metric that makes diverse computing resources comparable. The total WAC units consumed by a user determine the cost charged for the use of the computing services.

The number of WAC units used by an instance of an application, also termed herein a "workload", is determined by monitoring the six metrics. The information can be gathered periodically, e.g. every 20 sec. or every 5 min, and averaged by the hour in order to generate a number of WACs that accurately represent the usage of the services provided.

FIG. 1 shows a utility computing environment 100 according to an aspect of the present invention. A workload management platform 102 provides a node analysis engine 104, a metering engine 106, a consumption engine 108, and an optional profiling engine 110, the operation of which is described in detail below. The platform 102 communicates with a number of network infrastructure nodes 120, over a suitable network (not shown) such as the Internet. The network infrastructure nodes provide the computing resources to the utility computing environment 100.

Figure 2:
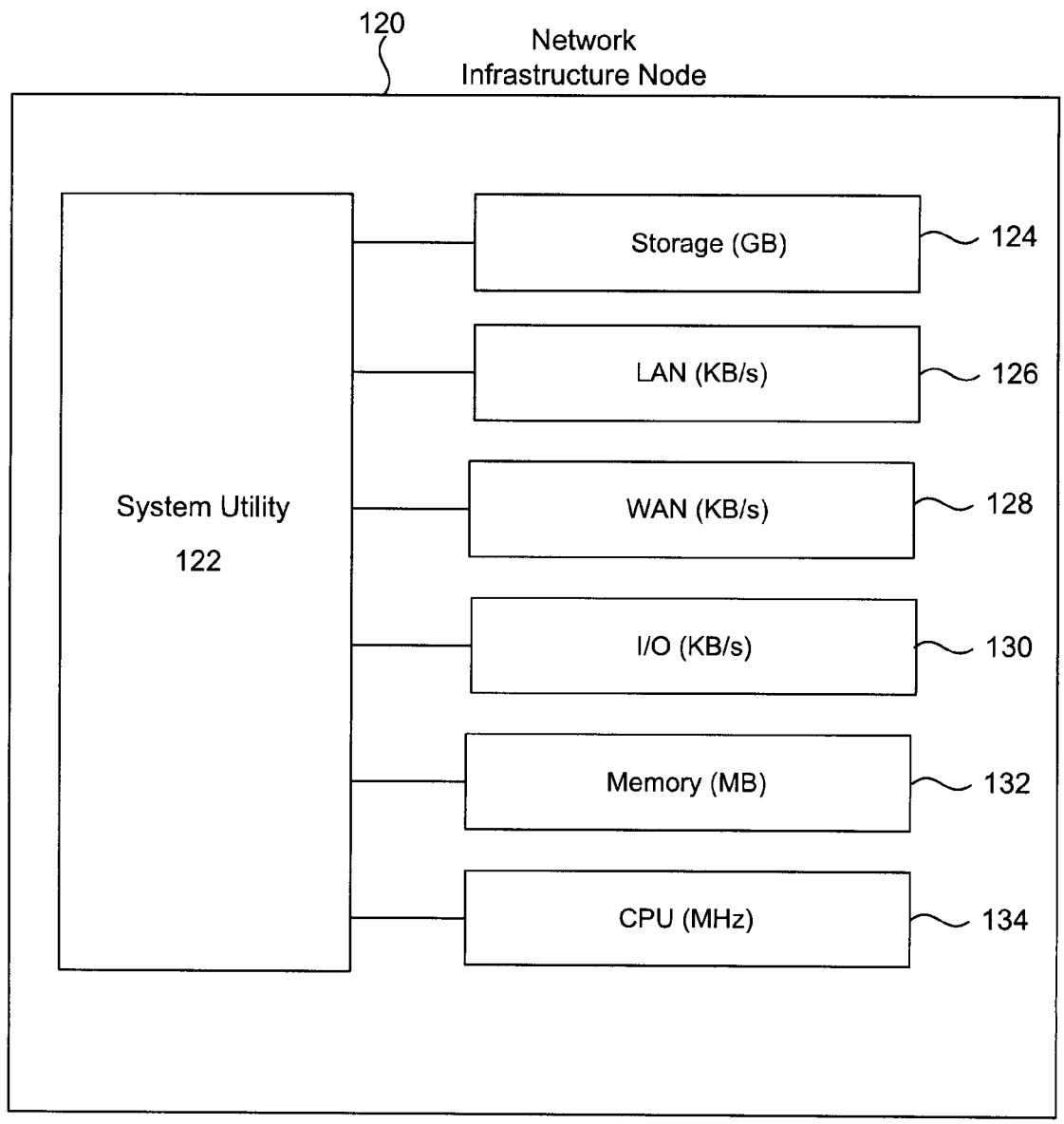
FIG. 2 is a block diagram of a network infrastructure node.

A generalized network infrastructure node 120 is shown in FIG. 2. The network infrastructure node is housed in facilities that include the physical real estate in which computing resources or 'raw materials'—e.g. servers, storage and networking equipment—are housed. In practice, a network infrastructure node 120 preferably provides each of the six resources: storage 124, network I/O: LAN 126 and WAN 128, disk I/O 130, memory 132 and CPU processing 134. However, the node 120 needs only to provide any one of the resources. A system utility 122 that interfaces with the metering engine 106 is also installed at each network infrastructure node 120.

Network services are 'bundled' into the utility computing environment as 'WAN I/O'. WAN I/O consists of public internet access. In order to supply WAN I/O to the present system, each infrastructure node should preferably be able to meet the following requirements: access to or provision of Class C IP address scheme; redundant switching equipment at the central office; fully staffed 7×24 Network Operations Center (NOC); less than 100 ms latency; redundant network pathways to primary POP; and access to traffic management and monitoring systems. Preferably, the raw materials deployment design should meet the following minimum configuration specifications: N+1 Server Cluster; RAID 5 Disk; meshed GB Ethernet switch; meshed storage network fabric (where applicable); and a minimum 2 Gbps Disk I/O (SAN configurations only).

Business consumers are the end users of the system. Platform 102 coordinates these suppliers and the necessary utility computing raw materials suppliers to cluster appropriate workloads. Each workload is monitored for reporting, security, account management and event logging by the platform 102.

The utility computing environment is preferably designed for maximum uptime, scalability and performance, and preferably strictly adheres to established ITIL best practices and maintains Uptime Institute compliance standards for facility certification. Preferably, the minimum facility requirements are based on the Uptime Institute's definition of a Tier III Concurrently Maintainable Site Infrastructure. A Tier III facility has redundant capacity components and multiple independent distribution paths serving the platform. However, only one distribution path serves the platform at any given time. All of the raw materials within the node should preferably be dual powered and installed properly to meet compliance requirements specified in the Uptime Institute's control document entitled "Fault Tolerant Power Compliance Specification, Version 2.0." A Tier III facility should also preferably have the ability to recover from operational errors or spontaneous failures of site infrastructure components, and have planned maintenance performed using the redundant capacity components and distribution paths without causing problems for the platform.

Figure 3:
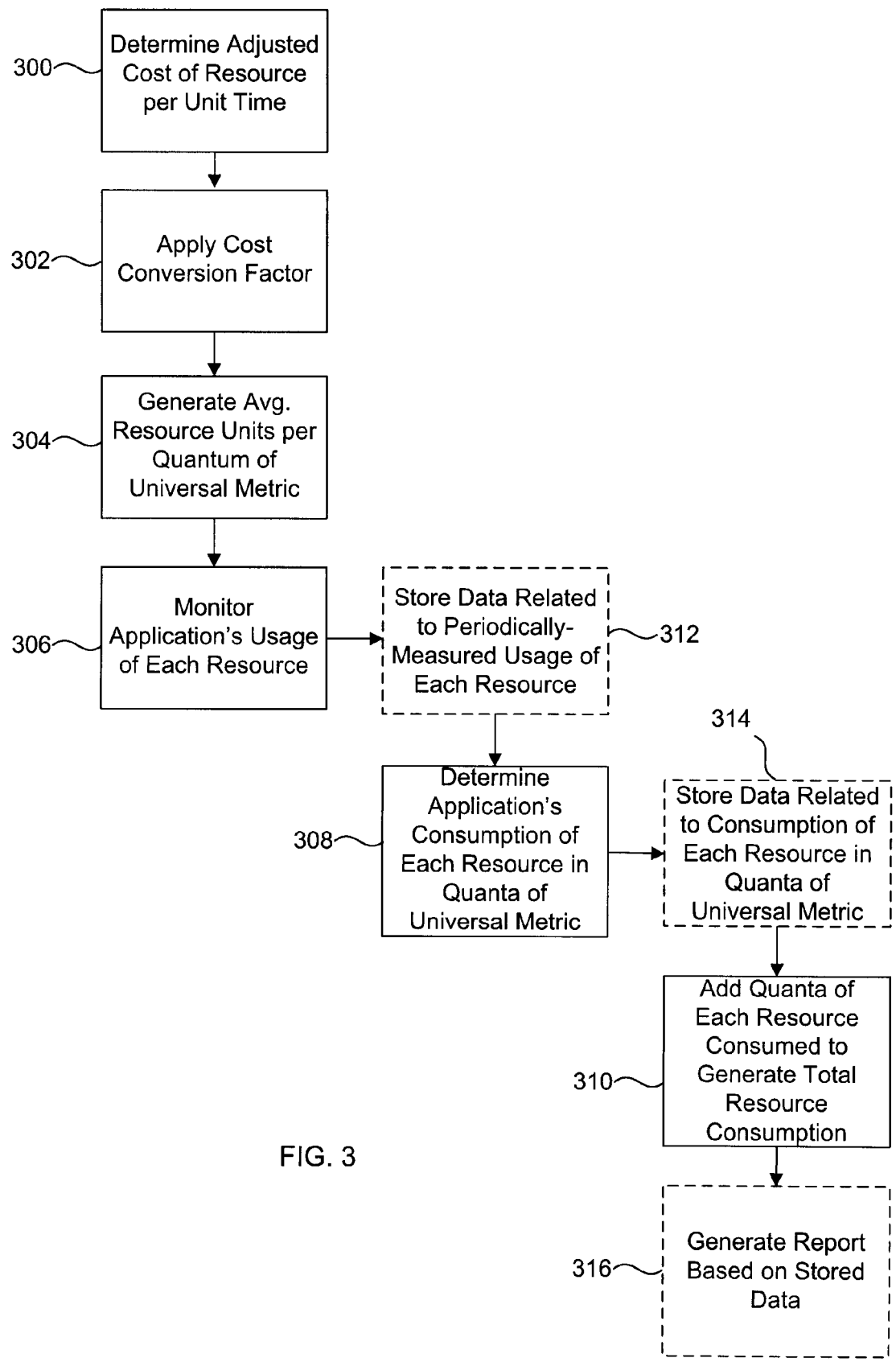
FIG. 3 is a flow chart of an embodiment of the method according to the present invention.

The operation of the various platform engines will now be described with reference to FIGS. 3-5. The node analysis engine 104 performs functions associated with profiling the raw materials or resources of the network infrastructure nodes 120. These steps are initialization steps performed when new infrastructure nodes are deployed. The node analysis engine 104 receives as an input a raw material profile that assesses the total resource capacity of each infrastructure node 120 according to the six metrics. The raw material profile takes into account the number of servers, drives, switches, bandwidth, etc. available and calculates the maximum capacity of CPU in MHz, memory in MB, disk I/O in KBps, network I/O for both LAN and WAN in KBps, and storage in GB, according to constraints set for each raw material type. The raw material profile can also take into account: server type and configuration design; UPS capacity; LAN topology; WAN connectivity, IP addressing; hypervisor type and management console; storage type and RAID configuration, and SAN fabric topology, where applicable.

For example, in order to estimate the value of the resources on the network infrastructure node, the raw material profile includes total Number of blade servers; total number of rack servers; total number of hard drives; and total Internet (WAN) capacity. In addition to the raw material quantities, the node analysis engine can require data as set out in Table 1:

TABLE 1

Example Raw Material Profile

| Raw Material Component | Cost of Goods (USD) | Primary Constraint Variables | | Secondary Constraint Variables | |
|---|---|---|---|---|---|
| | | Qty | Units | Qty | Units |
| Blade Server Chassis | $x | x | Servers | | |
| Blade Server | $x | x | CPU (MHz) | x | Memory (MB) |
| Rack Server | $x | x | CPU (MHz) | x | Memory (MB) |
| SAN Controller | $x | x | Hard Drives | x | Enclosures |
| Storage Enclosure | $x | x | Hard Drives | | |
| Hard Drive (FC) | $x | x | Storage (GB) | | |
| Hard Drive (other) | $x | x | Storage (GB) | | |
| Fiber Switches | $x | x | Ports | x | Disk I/O (Kbps) |
| Ethernet Switches | $x | x | Ports | x | LAN I/O (Kbps) |
| Fiber Cabling | $x | x | Port | | |
| Ethernet Cabling | $x | x | Port | | |
| Virtualization Console | $x | x | Servers | | |
| Hypervisor | $x | x | Server | | |
| Rack Space | $x p/mth | x | U | | |
| Internet Bandwidth | $x p/mth | x | WAN (Kbps) | | |

The node analysis engine 104 determines, for each resource type, an adjusted cost that is based on the cost of the resource. The additional factors that can be considered to adjust the cost base for each resource type can include, for example, operating costs and general overhead (e.g. electricity, facility lease costs, real estate costs, taxes, salaries for maintenance staff, etc.). These costs can be apportioned on a pro rata or other basis to each resource type. In addition, other weighting factors can be used to adjust the cost base of a resource type, as determined by the utility computing platform provider or the network infrastructure node provider. Once the cost of each resource type has been adjusted, the lifespan, lifecycle or an arbitrary cost recovery period (collectively termed here as "lifespan") can be assigned to each resource type. For example, a server may have an expected lifespan of two years, whereas the network infrastructure provider may wish to recoup the cost of a switch in 9 months, thus it can be assigned a lifespan of 9 months. In either case, the adjusted cost can be divided by the lifespan to determine a cost/predetermined time unit (e.g. $/month, $/day or $/hour) to deploy and operate each of the plurality of computing resource types (step 300).

The node analysis engine then applies a cost conversion factor to each adjusted cost (step 302). The cost conversion factor is an arbitrary factor determined by the utility computing platform operator as a base price/WAC unit. For example, a cost conversion factor of $0.15/hour-WAC can be used. Dividing the cost conversion factor by the adjusted cost/time, determines the number of resource units comprising a quantum or unit of the universal metric (e.g. for CPU: MHz/WAC; for storage GB/WAC). An average number of resource units per quantum of the universal metric can then be generated by averaging the number of resource units over the plurality of network infrastructure nodes for each resource type (step 304). These averages, as well as the individual data for each node, can be stored in the resource data storage 105.

Once the average resource units/universal metric unit have been determined for each of the monitored resource types, the metering engine 106 can use them to monitor computing resource usage by applications, or workloads, deployed to one or more nodes of the utility computing environment. The metering engine 106 receives periodically monitored usage of each computing resource type for a given application from the system utility 122 that is installed on each node. System utilities that monitor resource usage are well known. For example, the resource usage can be monitored every 20 sec. or every 5 min. These usage figures, which are collected and reported in the resource unit appropriate to each resource type, are analyzed to determine the number of resource units used by the application in a predetermined time period for each resource type. For example, the metering engine 106 can take an average of the five minute intervals and stores this information in the usage data store 107 (step 312). Similarly, the cumulative hour increments can be totaled and stored. The metering engine 106 then determines, for each resource type, the total number of universal metric units consumed in the predetermined time period by the application. This is achieved by converting the number of resource units used in the predetermined time period according to the average number of resource units per unit of the universal metric for the respective computing resource type (step 308). This information can be stored in the usage data storage 107 (step 314). The consumption engine 108 then generates the total resource consumption by adding the units consumed by the application in the predetermined time period for each computing resource type (step 310), and stores this information in the usage data store 107. As will be clear to those of skill in the art, the resource data and usage data stores 105 and 107, shown separately here, can be implemented as a single database accessible to all the engines.

Figure 6:
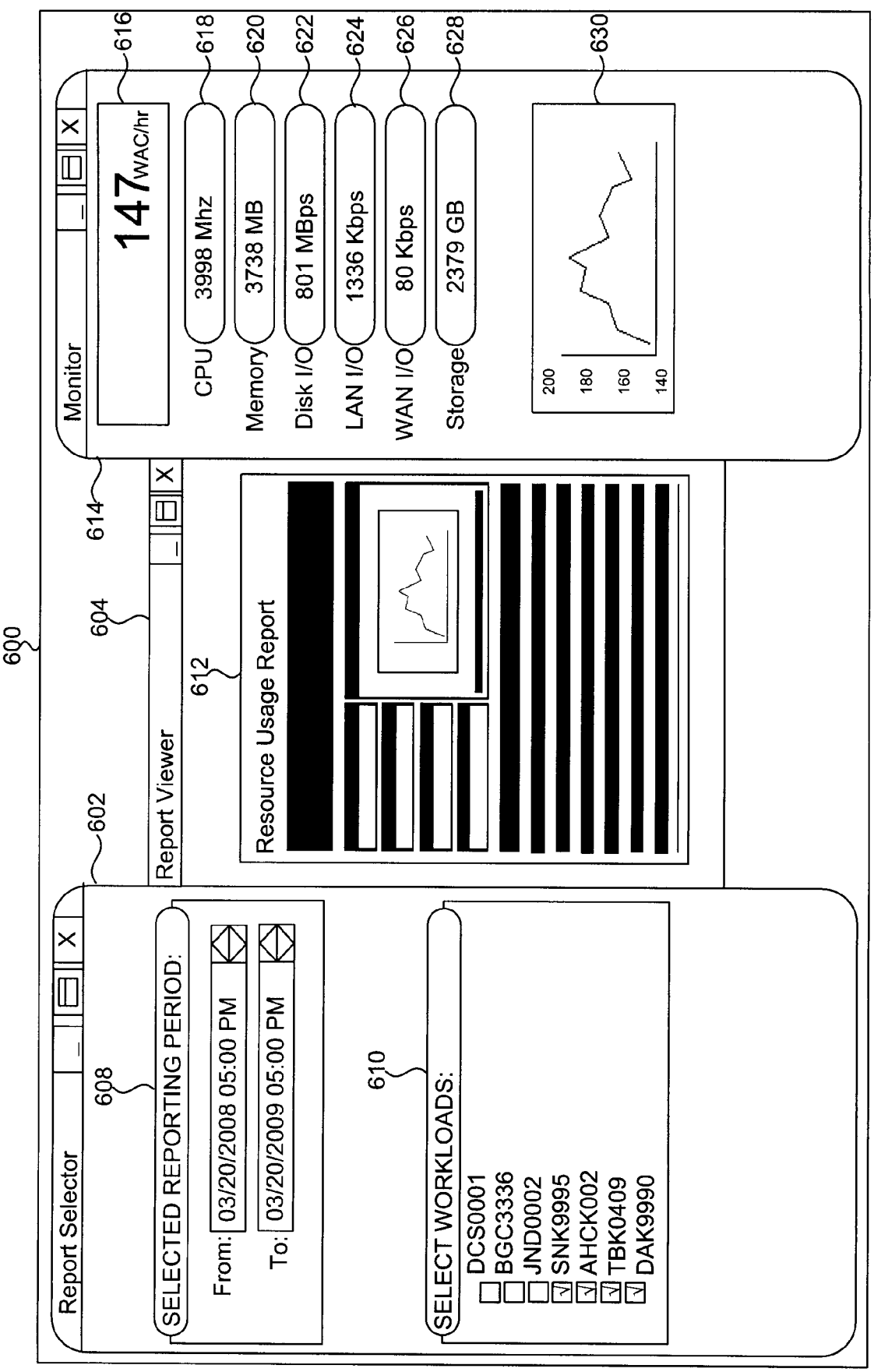
FIG. 6 is a representation of a reporting console according to the present invention.

The consumption engine 108 can also provide reporting and billing functions. Reports can be generated from the usage data according to any stored metric and for any appropriate time period (step 316). For example, referring to FIG. 6 which shows a console 600, the usage of one or more workloads can be monitored in real time reports as shown in the monitor window 614. The current usage of each resource type 618, 620, 622, 624 626 and 628 can be retrieved from the resource date storage 105 and displayed to the end user. Similarly, the current consumption, in terms of the universal metric, can be retrieved from the usage date store 107, and displayed at 616. Other instantaneous reporting functions can be implemented, such as a graphical view of resource usage 630. In addition, historical usage can be provided to the user in a report viewer window 604. A resource usage report 612 can be generated to show usage over any given time period (i.e. monthly, yearly, etc.), as specified in a reporting period selection window 608, for one or more workloads, as selected in a workload selection window 610, and to show trends in usage. The resource usage report can also be printable as, for example, a pdf.

As will be clear, the consolidation of computing resource usage metrics into one single metric can effectively function as a counting unit to determine an end user's actual use of those resources. The user can then be billed according to how many units they have used, at a cost/WAC determined by the utility computing platform provider.

Figure 4:
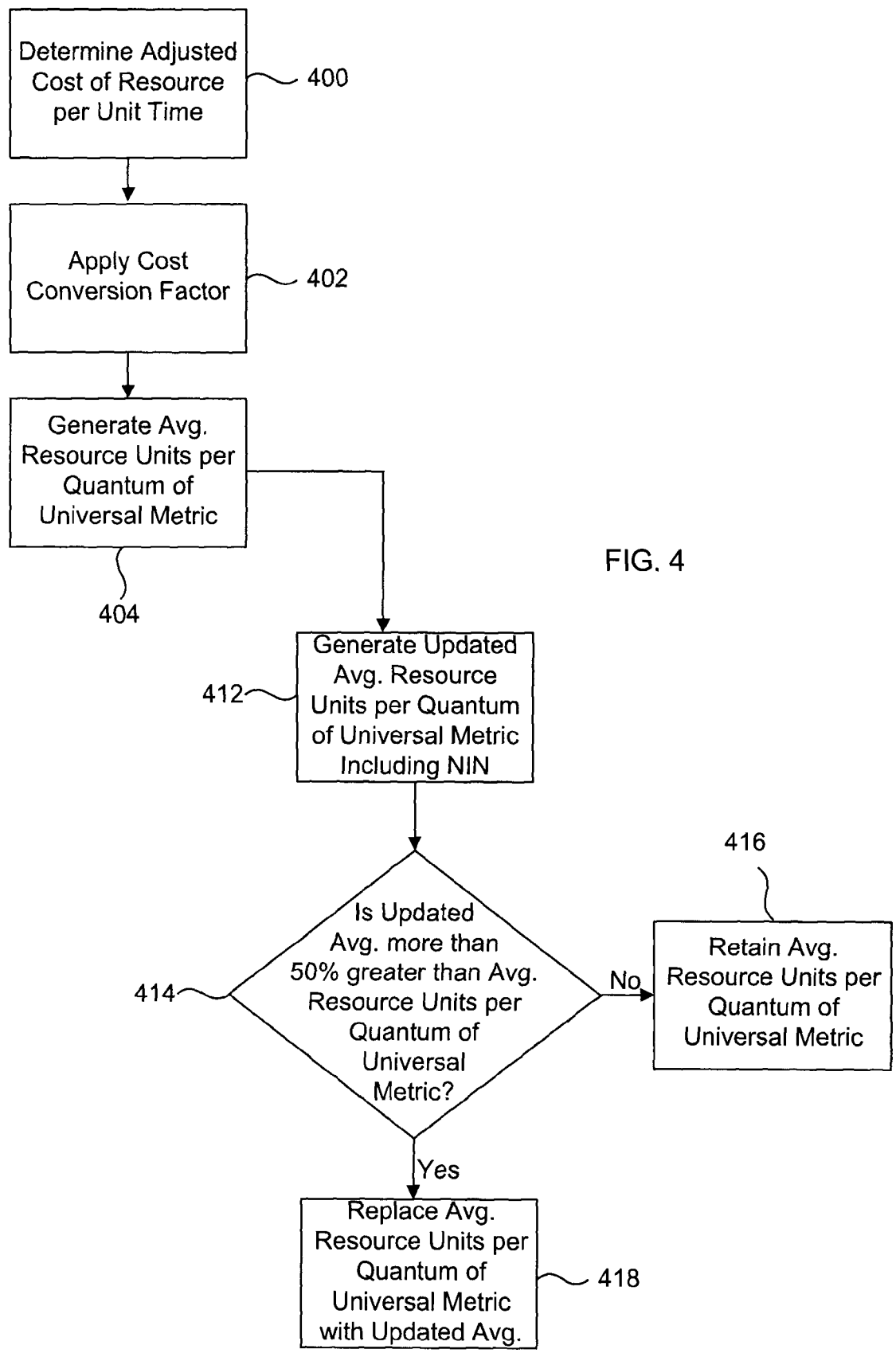
FIG. 4 is a flow chart of a further embodiment of the method according to the present invention.
Figure 5:
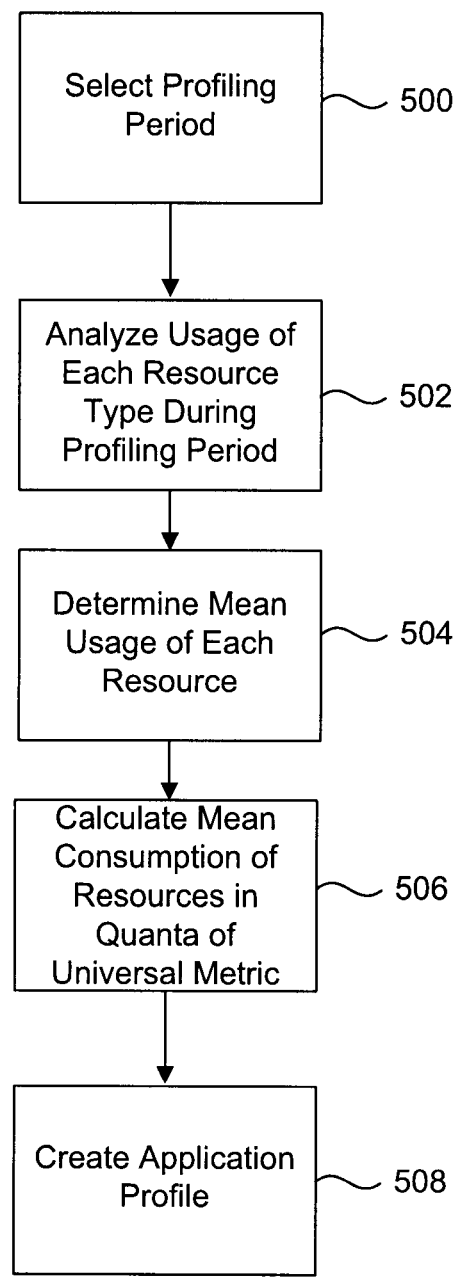
FIG. 5 is a flow chart of an embodiment of an application profiling method according to the present invention.

Referring to FIG. 4, a method of updating the average number of resource units equivalent to a unit of the universal metric is shown. In practice, the average number of resource units/WAC is re-assessed whenever a new network infrastructure node is added to the utility computing network. As used herein, a "new" network infrastructure node also includes nodes that have been reconfigured and redeployed to the network. As described above in relation to steps 300, 302, and 304, when a new network infrastructure node is added, or deployed, to the utility computing environment, an adjusted cost per predetermined time unit is determined for each resource type on the new node (step 400). The cost conversion factor is then applied (step 402) to each adjusted cost to determine a number of resource units comprising a quantum of a universal metric (step 404) for each computing resource associated with the new node.

The values across all the nodes are then averaged to generate an updated average number of resource units per quantum of the universal metric (step 412). If any of the updated averages exceed the previously stored average by more than a predetermined threshold (step 414), such as 50%, the average number of resource units per quantum of the universal metric is set to the updated average (418). Otherwise, the average number for each resource type are maintained at their currently stored values (step 416). As will be appreciated by those of skill in the art, this method updating the values associated with a WAC accounts for the ever-decreasing cost of computing resources, and ensures that the values of a WAC properly reflect these decreasing costs over time.

In order to efficiently deploy workloads to the appropriate nodes, it is necessary to have a profile of the application's expected computing resource needs. An application profile can be determined based on published system requirements for the application, or can be determined by the present system. Referring to FIG. 5, the profiling engine 110 can profile resource consumption of the application by analyzing the usage of each computing resource type by the application during a predetermined profiling period (steps 500 and 502), using the values collected and generated by the metering 106 and consumption 108 engines, as described above. The profiling engine can then determine a mean usage of each computing resource type over the profiling period (step 504). The profiling engine 110 can then determine mean resource consumption for each computing resource type by converting the mean usage according to the average number of resource units per quantum of the universal metric for the respective computing resource type (step 506). Once converted to the universal metric units, the usage of each computing resource can be summed together to provide an overall usage for the workload, or can be stored as a WAC profile for the particular application (step 508). In order to establish a WAC profile for the hosted application, the resource usage is preferably measured over a sustained period of time, ranging from 72 hours to 30 days. Different instances of the application, for example operating in different modes or on different nodes, can be profiled.

The present system and method make it possible for service providers to test, develop and launch production grade hosted technology services for their resellers and end-user clients. Having a single unit to measure resource usage simplifies the operation of any software system because end users can run any application, any time regardless of its resource requirements or intensity; eliminate any complex engineering considerations for computing architecture and design; eliminate the need to worry about physical resource planning, upgrades and lifecycle management; remove any requirement for niche virtualization engineering skill sets or expertise in house; and standardize the cost of enterprise centralized computing regardless of geographic location.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of determining computing resource usage in a utility computing environment having a plurality of network infrastructure nodes, each network infrastructure node including a plurality of computing resource types measured according to respective resource units, the method comprising:
    for each of the plurality of network infrastructure nodes:
        determining, for each type of computing resource, a cost per predetermined time unit to deploy and operate the type of computing resource, wherein the predetermined time unit is determined based on a lifespan of the type of computing resource; and
        applying a cost conversion factor to each cost per predetermined time unit to determine a number of resource units per Workload Allocation Cube (WAC) unit;
    for each type of computing resource, generating an average number of resource units per WAC unit by averaging the number of resource units over the plurality of network infrastructure nodes;
    for an application executing on at least one of the network infrastructure nodes, periodically monitoring usage of each type of computing resource to generate a number of resource units used in a predetermined time period;
    for each type of computing resource, determining a number of WAC units consumed in the predetermined time period by converting the number of resource units used in the predetermined time period according to the average number of resource units per WAC unit for the respective type of computing resource; and
    generating a total resource consumption by adding the number of WAC units consumed by the application in the predetermined time period for each type of computing resource.

2. The method of claim 1, further comprising:
    deploying a new network infrastructure node in the utility computing environment; for the new network infrastructure node:
        determining, for each type of computing resource, a cost per predetermined time unit to deploy and operate the type of computing resource in the new network infrastructure node, wherein the predetermined time unit is determined based on a lifespan of the type of computing resource; and
        applying the cost conversion factor to each adjusted cost to determine a number of resource units per WAC unit;
    for each type of computing resource in the new network infrastructure node, generating an updated average number of resource units per WAC unit by averaging the number of resource units over the plurality of network infrastructure nodes and the new network infrastructure node; and
    setting the average number of resource units per WAC unit to the updated average number of resource units per WAC unit when the updated average number of resource units per WAC exceeds the average number of resource units per WAC unit by a predetermined threshold.

3. The method of claim 2, wherein the threshold is 50%.

4. The method of claim 1, further comprising generating an adjusted total resource consumption by modifying the total resource consumption according to an environmental factor, wherein the environmental factor comprises at least one of a location of the network infrastructure node and an overhead cost factor.

5. The method of claim 1, further comprising profiling resource consumption of the application by:
    analyzing the usage of each type of computing resource by the application during a predetermined profiling period to determine a mean usage of each type of computing resource; and
    for each type of computing resource, generating a mean resource consumption by converting the mean usage according to the average number of resource units per WAC unit for the respective type of computing resource.

6. The method of claim 5, further comprising generating a total mean resource consumption for the application by adding the mean resource consumptions for each type of computing resource.

7. The method of claim 5, wherein the resource consumption is profiled for different operating modes of the application.

8. The method of claim 5, wherein the mean resource consumption for each type of computing resource is periodically updated.

9. The method of claim 1 further comprising:
    storing data related to at least one of the periodically monitored usage of each type of computing resource, the number of WAC units consumed in the predetermined time period for each type of computing resource and the total resource consumption; and,
    generating a report based on the stored data.

10. A tangible non-transitory computer-readable medium containing an embedded computer program product, the computer program product operating within a utility computing system having a plurality of network infrastructure nodes, each network infrastructure node including a plurality of types of computing resource measured according to respective resource units, the computer program product comprising code, which, when executed on a processor, causes the processor to provide:
    a node analysis engine that:
        determines, for each type of computing resource, a cost per predetermined time unit to deploy and operate the computing resource type, wherein the predetermined time unit is determined based on a lifespan of the type of computing resource;
        applies a cost conversion factor to each cost per predetermined time unit to determine a number of resource units per Workload Allocation Cube (WAC) unit; and
        for each type of computing resource, generates an average number of resource units per WAC unit by averaging the number of resource units over the plurality of network infrastructure nodes;
    a metering engine that:
        receives, for an application executing on at least one of the network infrastructure nodes, periodically monitored usage of each type of computing resource to generate a number of resource units used in a predetermined time period; and for each type of computing resource, determines a number of WAC units consumed in the predetermined time period by converting the number of resource units used in the predetermined time period according to the average number of resource units per WAC unit for the respective type of computing resource; and, a consumption engine that generates a total resource consumption by adding the number of WAC units consumed by the application in the predetermined time period for each type of computing resource.

11. The tangible non-transitory computer-readable medium containing an embedded computer program product of claim 10, wherein, for a new network infrastructure node deployed in the utility computing environment, the node analysis engine further:

determines, for each type of computing resource in the new network infrastructure node, a cost per predetermined time unit to deploy and operate the type of computing resource, wherein the predetermined time unit is determined based on a lifespan of the type of computing resource;

applies the cost conversion factor to cost per predetermined time unit to determine a number of resource units per WAC unit;

for each computing resource, generates an updated average number of resource units per WAC unit by averaging the number of resource units over the plurality of network infrastructure nodes and the new network infrastructure node; and sets the average number of resource units per WAC unit to the updated average number of resource units per WAC unit when the updated average number of resource units per WAC unit exceeds the average number of resource units per WAC unit by a predetermined threshold.

12. The tangible non-transitory computer-readable medium containing an embedded computer program product of claim 10 wherein the consumption engine further generates an adjusted total resource consumption by modifying the total resource consumption according to an environmental factor, wherein the environmental factor comprises at least one of location of the network infrastructure node and an overhead cost factor.

13. The tangible non-transitory computer-readable medium containing an embedded computer program product of claim 10 further causes the processor to provide a profiling engine that profiles resource consumption of the application by:

analyzing the usage of each type of computing resource by the application during a predetermined profiling period to determine a mean usage of each type of computing resource; and for each type of computing resource, generating a mean resource consumption by converting the mean usage according to the average number of resource units per quantum of the universal metric for the respective type of computing resource.

14. The tangible non-transitory computer-readable medium containing an embedded computer program product of claim 13, wherein the profiling engine further generates a total mean resource consumption for the application by adding the mean resource consumptions for each type of computing resource.

15. The tangible non-transitory computer-readable medium containing an embedded computer program product of claim 13, wherein the profiling engine further profiles resource consumption for different operating modes of the application.

16. The tangible non-transitory computer-readable medium containing an embedded computer program product of claim 13, wherein the profiling engine further updates mean resource consumption for each type of computing resource periodically.

17. The tangible non-transitory computer-readable medium containing an embedded computer program product of claim 10, wherein the consumption engine further:

stores data related to at least one of the periodically monitored usage of each type of computing resource, the number of the WAC units consumed in the predetermined time period for each type of computing resource and the total resource consumption; and generates a report based on the stored data.

* * * * *